United States Patent [19]
Arai et al.

[11] Patent Number: 5,915,134
[45] Date of Patent: Jun. 22, 1999

[54] SWITCHING DEVICE WITH DX CONTACTS FOR A CAMERA

[75] Inventors: Akihiro Arai; Yutaka Kamijo, both of Tokyo, Japan

[73] Assignee: Asahi Kogaku Kogyo Kabushiki Kaisha, Tokyo, Japan

[21] Appl. No.: 09/095,840

[22] Filed: Jun. 11, 1998

Related U.S. Application Data

[62] Division of application No. 08/845,769, Apr. 28, 1997, Pat. No. 5,839,010, which is a division of application No. 08/577,706, Dec. 22, 1995, Pat. No. 5,678,107.

[30] Foreign Application Priority Data

Dec. 27, 1994 [JP] Japan ................................ 6-326323

[51] Int. Cl.⁶ ..................................................... G03B 7/24
[52] U.S. Cl. .......................................... 396/208; 396/543
[58] Field of Search ..................................... 396/208, 538, 396/543

[56] References Cited

U.S. PATENT DOCUMENTS

| | | |
|---|---|---|
| 4,112,447 | 9/1978 | Iwata . |
| 4,200,371 | 4/1980 | Suzuki et al. ........................... 396/208 |
| 4,324,472 | 4/1982 | Terada et al. . |
| 5,539,492 | 7/1996 | Higaki . |
| 5,678,107 | 10/1997 | Arai et al. . |

*Primary Examiner*—Howard B. Blankenship
*Attorney, Agent, or Firm*—Greenblum & Bernstein, P.L.C.

[57] ABSTRACT

A release switch is directly activated by a self-timer button, and a shutter release button first activates a photometric switch, then the release switch. The self-timer operation is carried out in response to the activation of only the release switch, a photometric operation is carried out in response to the activation of only the photometric switch, and a shutter release operation is carried out in response to the secuential activation of both the photometric switch and the release switch.

4 Claims, 9 Drawing Sheets

NORMAL OPERATION

SELF TIMER OPERATION

SWITCHING DEVICE WITH DX CONTACTS FOR A CAMERA

This application is a division of U.S. application Ser. No. 08/845,769, filed Apr. 28, 1997, now U.S. Pat. No. 5,839,010, which is a division of U.S. application Ser. No. 08/577,706, filed Dec. 22, 1995, which issued as U.S. Pat. No. 5,678,107, on Oct. 14, 1997. The entire disclosures of prior U.S. application Ser. Nos. 08/845,769 and 08/577,706, are considered to be part of the disclosure of the present application and are hereby expressly incorporated by reference herein in their entireties.

BACKGROUND OF THE INVENTION

The present invention relates to a switching device to be used in a camera and, more particularly, a switching device for controlling both self-timer and normal operations in a camera. Conventionally, when a self-timer operation is to be executed by a camera, the operational mode is first Phrased to a self-timer standby mode by means of a self-timer switch. Thereafter, the shutter release button is depressed, and the self-timer operation is carried out.

however, the use of many independent switches and modes increases the cost of the camera and makes the operation of the camera complicated. Furthermore, in conventional cameras, switching devices (such as, for example, shutter release and self-timer buttons) consist of many switching parts, springs and lead wires.

The combination of these factors results in many problems, among them a high part count, an overcomplicated structure, poor assembling efficiency, and high cost.

SUMMARY OF THE INVENTION

It is therefore an object of the present invention to provide an improved switching device for a camera, capable of readily executing self-timer photographing, yet making the structure simple while improving assembling efficiency.

In order to meet the objects of the invention, a switching device for a camera includes: a photometric switch; a release switch; a shutter release button, operatively connected to the release switch and to the photometric switch, for turning ON the photometric switch when half depressed and turning ON both of the release switch and the photometric switch when further depressed; and a self-timer button, operatively connected to the release switch, for turning ON only the release switch when depressed. Accordingly, the switching device of the camera is able to discriminate the desired operation of self-timer or normal operations.

Preferably, the switching device further includes control means for detecting the turning ON of the release switch and the photometric switch and for executing a self-timer operation when the release switch is ON but the photometric switch is OFF. In this manner, the switching device sets and executes the self-timer operation in response to a combination of switch states when the self-timer button is depressed.

In this case, the control means preferably executes a photometric operation when the release switch is OFF but the photometric switch is ON, and executes a shutter release operation when the release switch is ON and the photometric switch is ON. In this manner, the switching device sets and executes subsequent photometric and shutter release operations in response to a combination of switch states when the shutter release button is depressed.

In one particular case, the switching device includes: a shatter release contact arranged to be depressable by the shutter release button; a self-timer contact arranged to be depressable by the self-timer button; a photometric contact opposing the shutter release contact, provided to the photometric switch; and a first and a second electrical contact provided to the release switch, the first electrical contact opposing the self-timer contact, and the second electrical contact opposing the photometric contact. Accordingly, the appropriate switches can be activated by the closing of contacts in the correct combinations when the buttons are depressed.

In this case, when the shutter release button is half depressed, the shutter release contact electrically connects to the photometric contact, and when the shutter release button is further depressed, all of the shutter release contact, the photometric contact, and the second electrical contact of the release switch electrically connect. When the self-timer button is depressed, the self-timer contact electrically connects to the first electrical contact of the release switch. The correct combinations of contact positions to electrically connect the switches are achieved with this arrangement of contacts.

In this arrangement of contacts, the switching device preferably includes control means for executing a self-timer operation when the self-timer contact is electrically connected to the release switch, for executing a photometric operation when the shutter release contact is electrically connected to the photometric switch, and for executing a shutter release operation when all of the shutter release contact, the photometric contact, and the release switch electrically connect.

According to a particular development, the photometric switch includes a photometric switch plate upon which the photometric contact is provided, and the release switch includes a release switch plate upon which the first and second electrical contacts are provided. The use of switch plates facilitates the arrangement of the contacts. In this case, the photometric switch plate and the release switch plate are formed from, conductive and resilient plate spring material, and the photometric switch plate is formed substantially in a U-shape, surrounding the release switch plate. The combinations of contact positions can thereby be compactly achieved. A particularly favorable arrangement is implemented when the U-shape of the photometric switch plate includes an upper arm above the release switch plate and a lower arm below the release switch plate, and the photometric contact is formed on the upper arm.

In another development, the self-timer contact and the shutter release contact are provided on a unitary common switch plate, and the photometric switch plate and the release switch plate are supported by a chassis of the camera, and the common switch plate, shutter release button, and self-timer button are supported by a front decorative plate fixed to the camera body. In this case, each of the contact-supporting switch plates are arranged in a compact space and can be easily assembled.

In a preferred arrangement, the common switch plate is provided with a first resilient arm bearing the shutter release contact and a second resilient arm bearing the self-timer contact, and the first resilient arm and the second resilient arm bias the shutter release button and the self-timer button, respectively, toward undepressed positions. In this manner, the elements of the common switch plate serve as electrical contacts and as resilient members to provide a return action in the button operation.

According to one preferred embodiment, a plurality of resilient tabs, for holding the release switch plate and the photometric switch plate, are provided on the chassis displaced from one another. The resilient tabs have clearances therebetween into which the release switch plate and photometric switch plate are inserted. In this manner, the assembly of the switch plates is easily accomplished.

In this case, the plurality of resilient tabs preferably includes means for locking the release switch plate and the photometric switch plate into the clearances therebetween. The release switch plate may be inserted and locked between a first and a second resilient tab of the plurality of resilient tabs, and the photometric switch plate may be inserted and locked between the second resilient tab and a third resilient tab of the plurality of resilient tabs. In this manner, each of the switch plates is snapped into place, and resilient tabs can participate in holding more than one switch plate, with minimum number of resilient tabs being used to hold the switch plates.

In another preferred embodiment, the self-timer contact and the shutter release contact are provided on a unitary common switch plate, and the camera chassis is provided with an electrically conductive plate for connecting the common switch plate with common DX code conductive pattern terminals of a film cartridge inserted in the camera. In this case, the camera may detect whether or not a film having a DX code conductive pattern portion defining a predetermined group of film speeds is inserted in the camera.

DETAILED DESCRIPTION OF THE PREFERRED EMBODIMENTS

Figure 1:
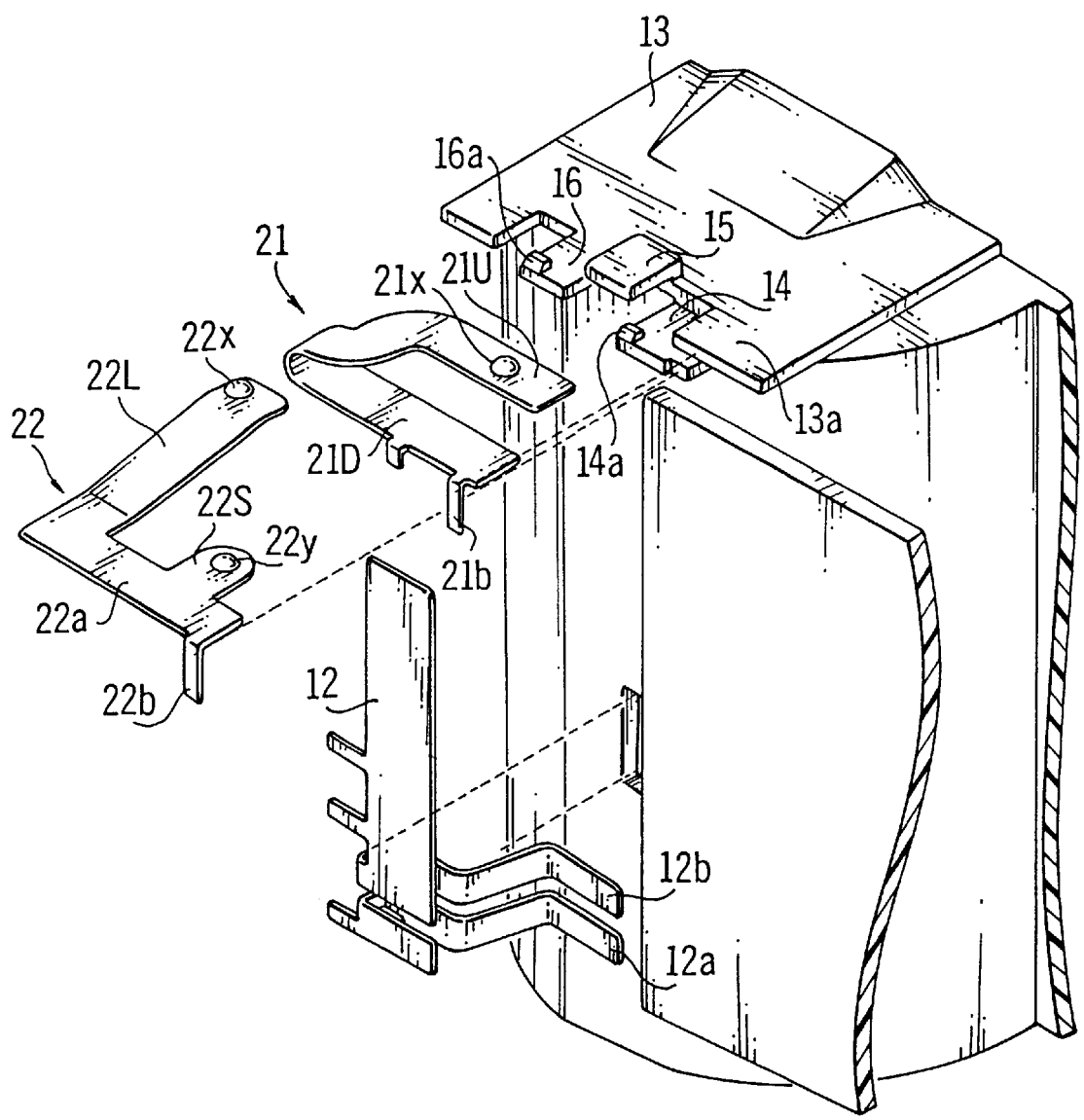
FIG. 1 is an exploded view showing a mounting arrangement of an embodiment of the switching devise according to the invention.
Figure 2:
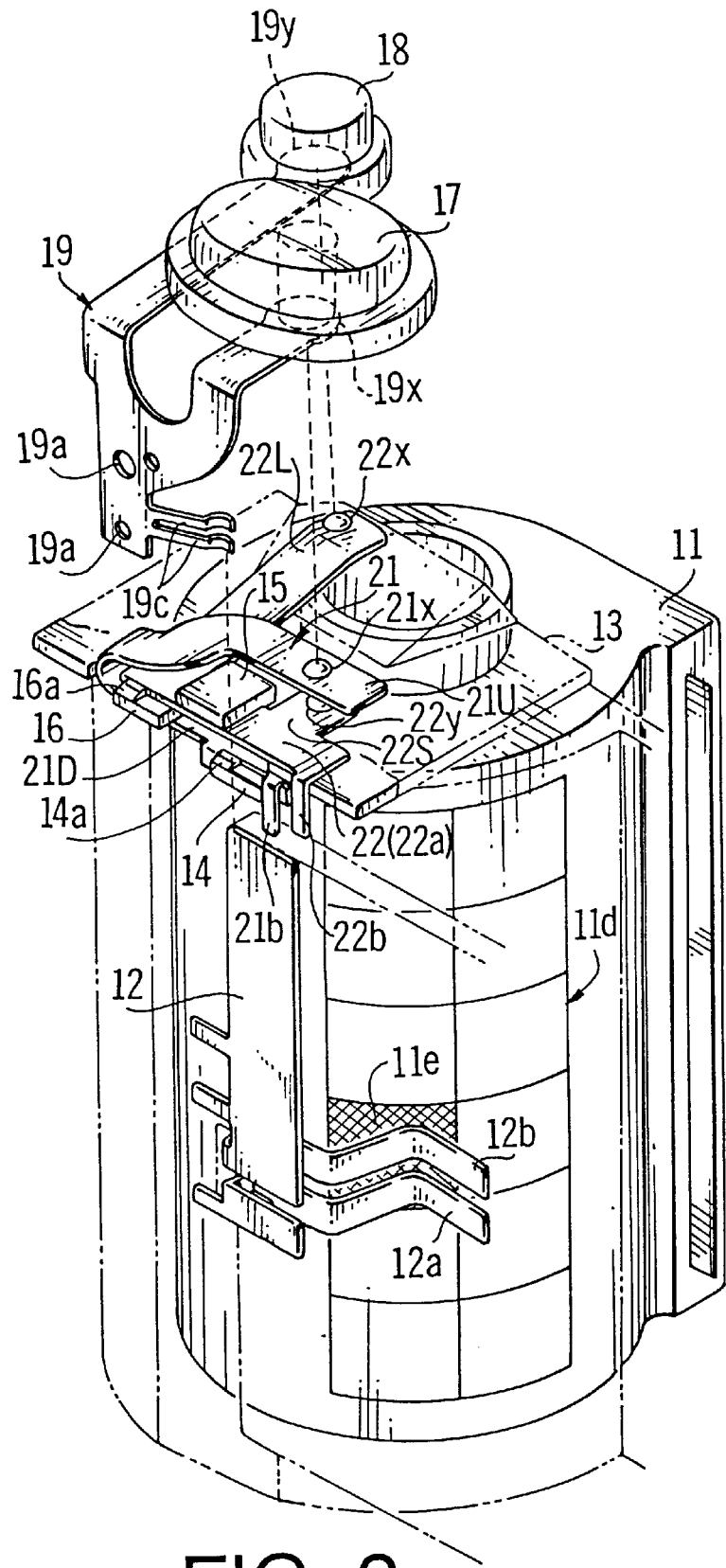
FIG. 2 is an partially exploded view showing an arrangement of switches in the embodiment of a switching device.
Figure 3:
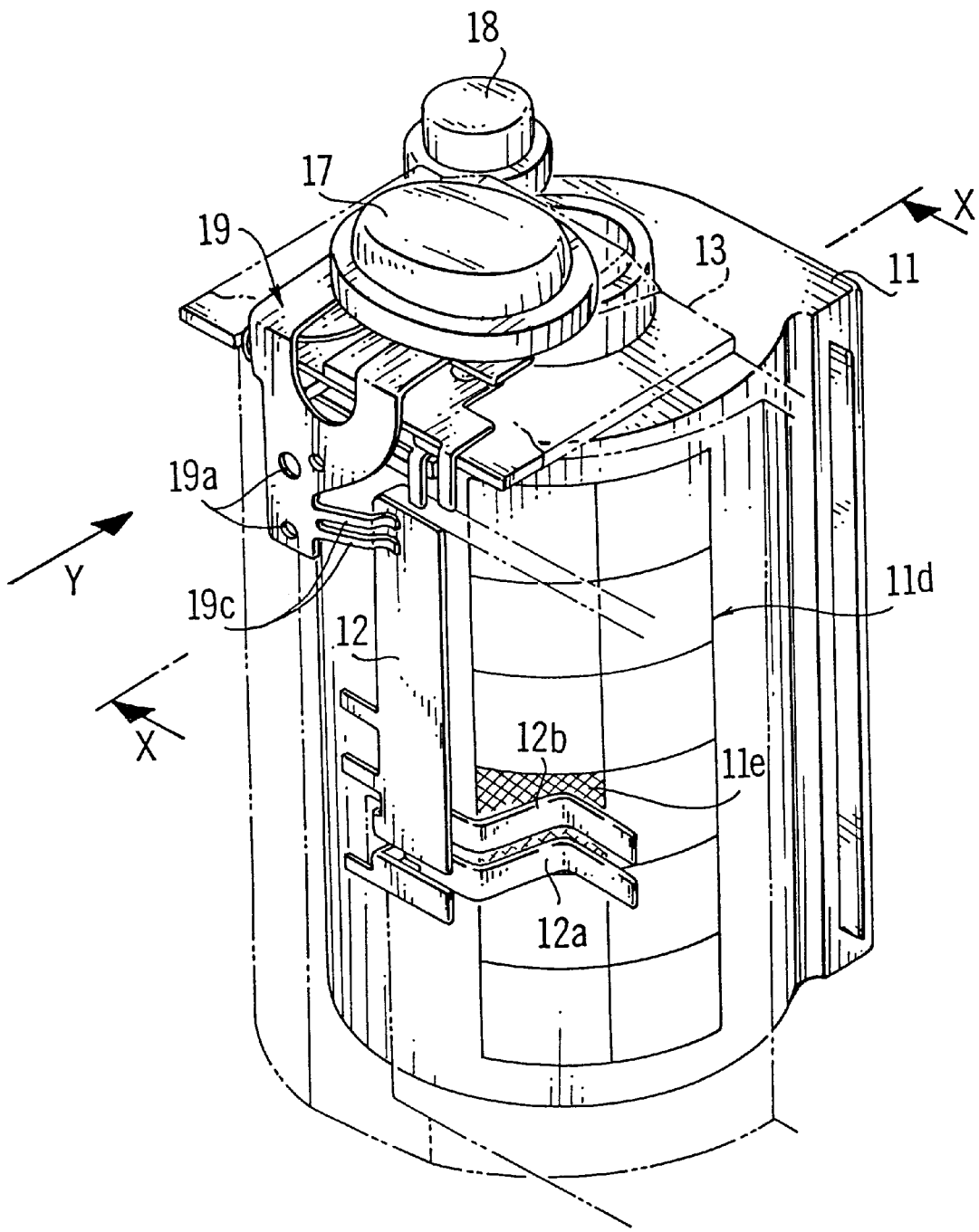
FIG. 3 is a perspective view showing the assembled condition of the embodiment of a switching device.

The embodiment of a switching device according to the invention is shown in perspective and exploded views from FIG. 1 through FIG. 3. FIG. 1 is an exploded view showing the arrangement of switch plates on a plastic camera body 13; FIG. 2 is a partially exploded view showing switch plates and buttons assembled to the plastic camera body 13; and FIG. 3 is a perspective view showing the assembled switching device. In FIGS. 2 and 3, the plastic camera body 13 is shown by a phantom line.

As shown in FIGS. 1 and 2, a photometric switch plate 21 and a release switch plate 22 are supported by portions of the plastic camera body 13. The photometric switch plate 21 is formed from resilient and conductive plate spring material, in a substantially U-shape. A lower arm 21D forms a lower side of the U-shape, while an Upper (plate spring) arm 21U forms an upper portion of the U-shape. An upper contact 21x, which acts as a photometric switch $PH_{SW}$ in combination with a shutter release contact arm 19x (shown in FIGS. 2 and 4), is formed on the upper arm 21U. The photometric switch plate 21 further includes a terminal 21b extending from the lower arm 21D, to which a signal connection to a microcontroller 25 (shown in FIG. 7) is made.

The release switch plate 22 is formed from resilient and conductive plate spring material, and is shaped having a mounting base 22a with a long arm 22L and a short arm 22S extending in the same direction from the base 22a. The long arm 22L is bent up from the base 22a, and has a first contact 22x near its distal end. The first contact 22x acts as a release switch $RLS_{SW}$ in combination with a self-timer contact arm 19y (shown in FIGS. 2 and 4). The short arm 22S is substantially coplanar with the base 22a, and has a second contact 22y hear its distal end. The second contact 22y acts as the release switch $RLS_{SW}$ in combination with the shutter release contact arm 19x (shown in FIGS. 2 and 4) and the upper contact 21x. The release plate 22 further includes a terminal 22b extending from the base 22a, to which a signal connection to the controller 25 (shown in FIG. 7) is made.

As shown in FIG. 1, a lower resilient locking tab 14, an upper resilient locking tab 15, and a middle resilient locking tab 16 extend from the camera body 3. The locking tabs 14, 15, and,16 are used for mounting the photometric switch plate 21 and release switch plate 22. From the perspective of FIG. 1, the middle locking tab 16 is separated from the upper locking tab 15 in the vertical direction by a clearance approximately the thickness of the mounting base 22a of the release switch plate 22, and is positioned to the left of the upper locking tab 15. The lower locking tab 14 is separated from the middle locking tab 16 in the vertical direction by a clearance approximately the thickness of the lower arm 21D of the photometric switch plate 21, and is positioned to the right of both the upper locking tab 15 and the middle locking tab 16. The lower locking tab 14 is provided with an upwardly extending locking hook 14a. Similarly, the middle locking tab 16 is provided with an upwardly extending locking hook 16a.

Figure 4:
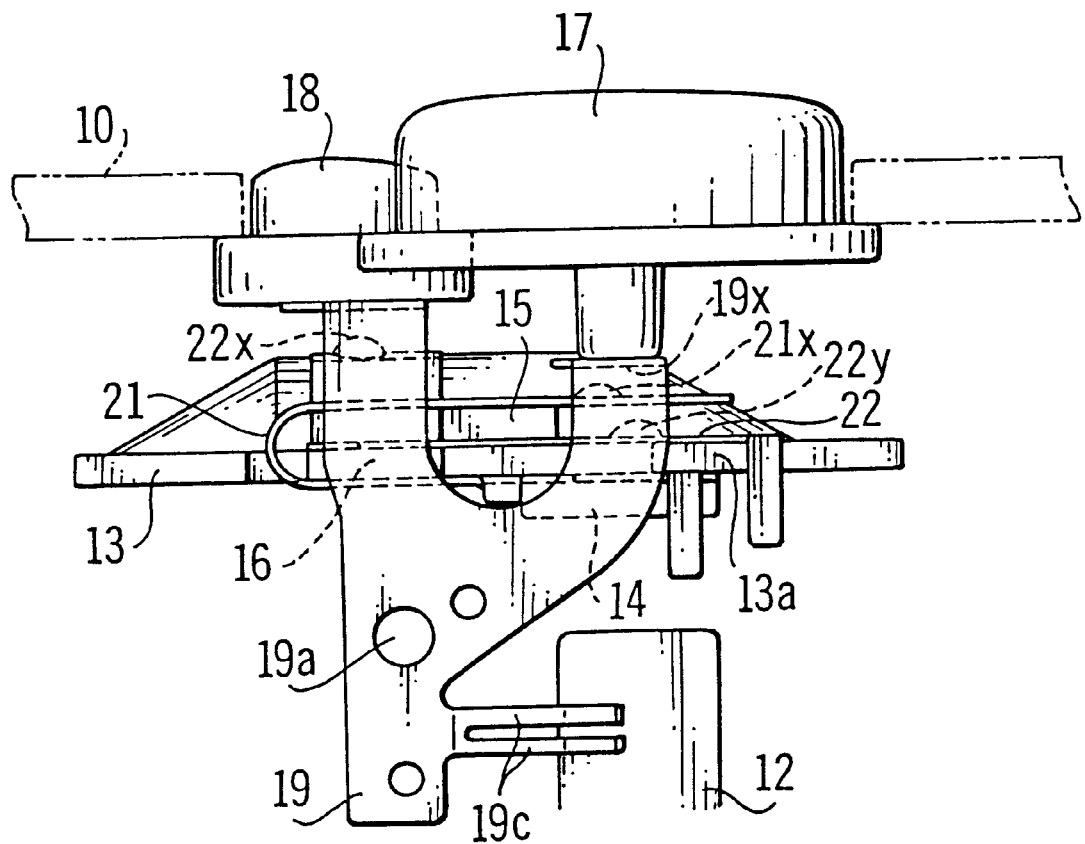
FIG. 4 is a front view showing the mounting of the switching device to a camera body, from the viewpoint of arrow Y in FIG. 3.

One of the features of this embodiment is the supporting and mounting structure for the photometric switch plate 21 and release switch plate 22, including the locking tabs 14, 15, and 16, and shown in FIGS. 1, 2, and 4. The lower arm 21D of the photometric switch plate 21 is inserted and locked in the clearance between the lower locking tab 14 and the middle locking tab 16. Each of the locking tabs 14, 15, and 16 is resilient, being unitarily formed with the plastic camera body. According to this embodiment, the locking tabs 14, 15, and 16 of the plastic camera body 13 slightly bend (resiliently) when the switch plates 21 and 22 are mounted to the body 13, but the plate spring switch plates 21 and 22 may be alternatively formed to be more resilient than the plastic camera body 13. When the photometric switch plate 21 is inserted, it pushes the locking hook 14a of the resilient lower locking tab 14 downward, and also pushes the resilient middle locking tab 16 slightly upward. The lower side of a camera body portion 13a provides an additional resistance on the side of the lower locking tab 14 opposite the middle locking tab 16. Alternatively, the locking tabs 14, 15, and 16 can be formed to slightly overlap in the vertical direction to act against any moment upon insertion. When the trailing edge of the lower arm 21D passes the locking hook 14a, the lower arm 21D snaps into the clearance between the tabs 14 and 16, and the tabs 14 and 16 elastically snap back to their neutral positions. At this time, a click sound is generated, verifying the proper mounting of the photometric switch plate 21. The locking hook 14a prevents any movement of the photometric switch plate 21 out of the clearance. Thus, the photometric switch plate 21 inserted in the slit is locked into the clearance between the lower locking tab 14 and the middle locking tab 16 by the locking hook 14a.

The mounting base 22a of the release switch plate 22 is similarly supported and locked, and is similarly inserted. Specifically, the mounting base 22a of the release switch plate 22 is inserted and locked in the clearance between the middle locking tab 16 and the upper locking tab 15. When the release switch plate 22 is inserted, it pushes the locking hook 16a of the resilient middle locking tab 16 downward, and also pushes the resilient upper locking tab 15 slightly upward. The upper side of the camera body portion 13a provides an additional resistance on the side of the upper locking tab 15 opposite the middle locking tab 16. When the trailing edge of the mounting base 22a passes the locking hook 16a, the mounting base 22a elastically snaps into the clearance between the tabs 16 and 15, and the tabs 16 and 15 elastically snap back to their neutral positions. At this time, a click sound is generated, verifying the proper mounting of the release switch plate 22. The locking hook 16a prevents any movement of the release switch plate 22 out of the clearance. Thus, the release switch plate 22 inserted in the slit is locked into the clearance between the middle locking tab 16 and the upper locking tab 15 by the locking hook 16a.

Figure 5A:
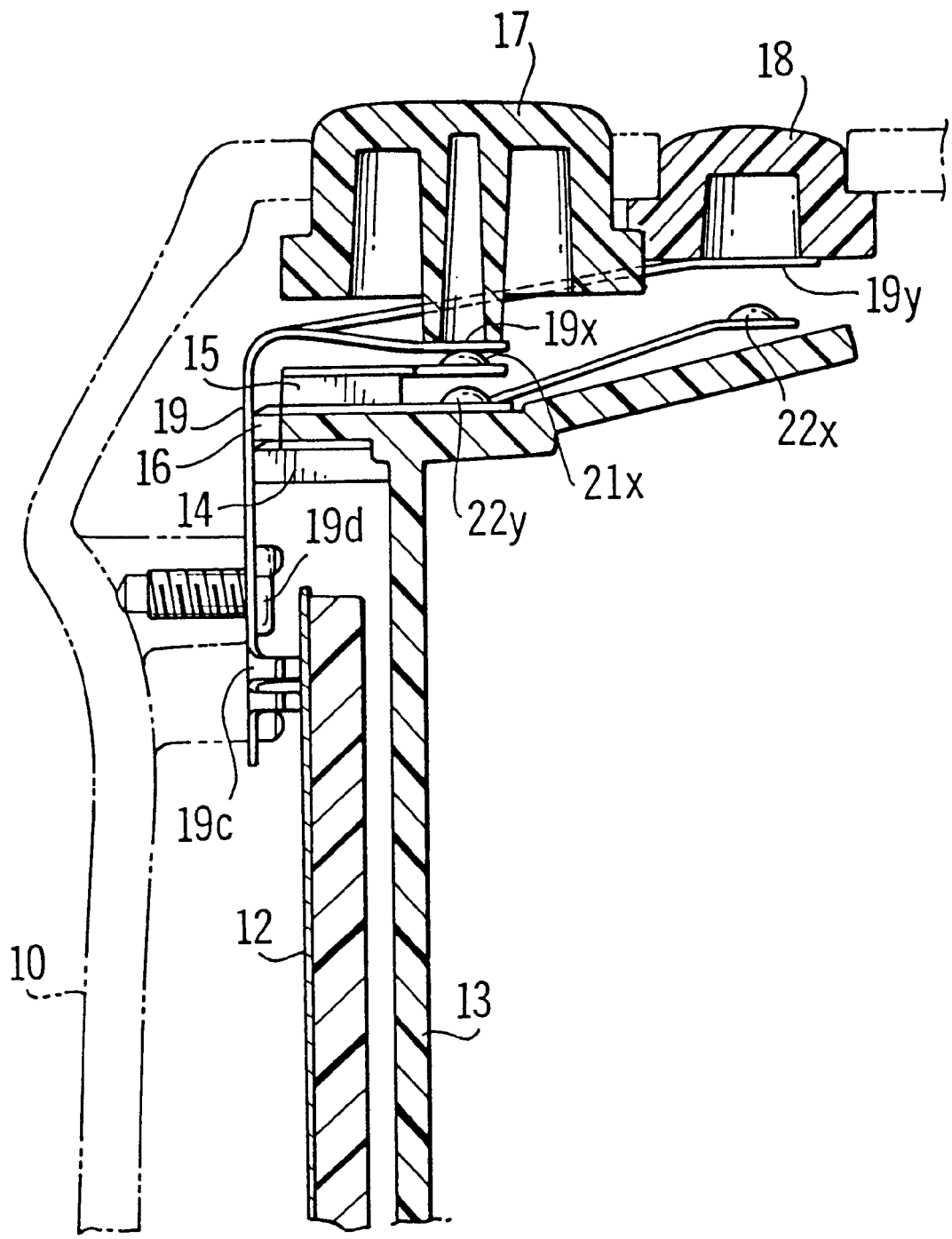
FIG. 5A is a sectioned view along line X—X of FIG. 3, showing a half depressed shutter release button.
Figure 5B:
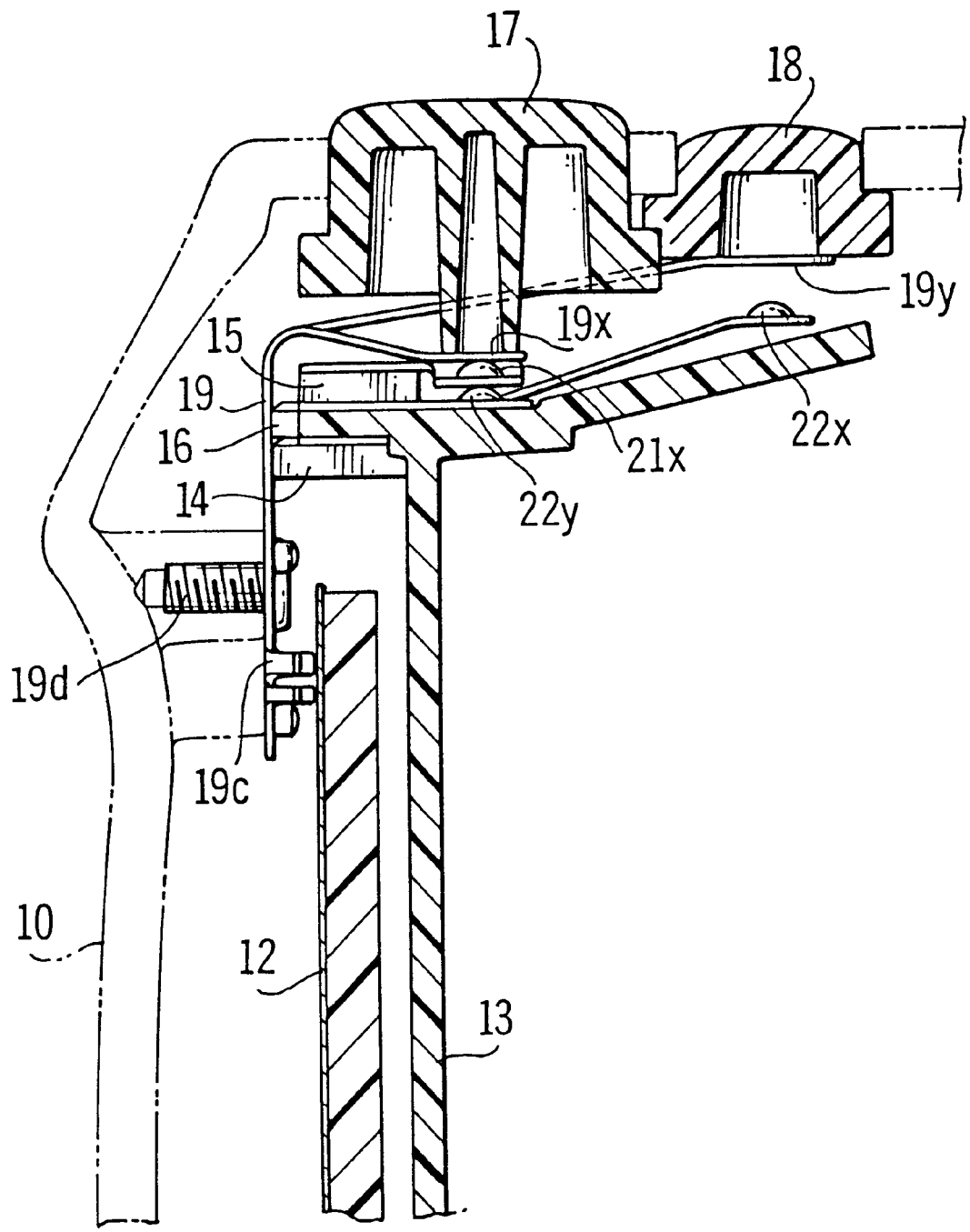
FIG. 5B is a sectioned view along line X—X of FIG. 3, showing a fully depressed shutter release button.
Figure 6:
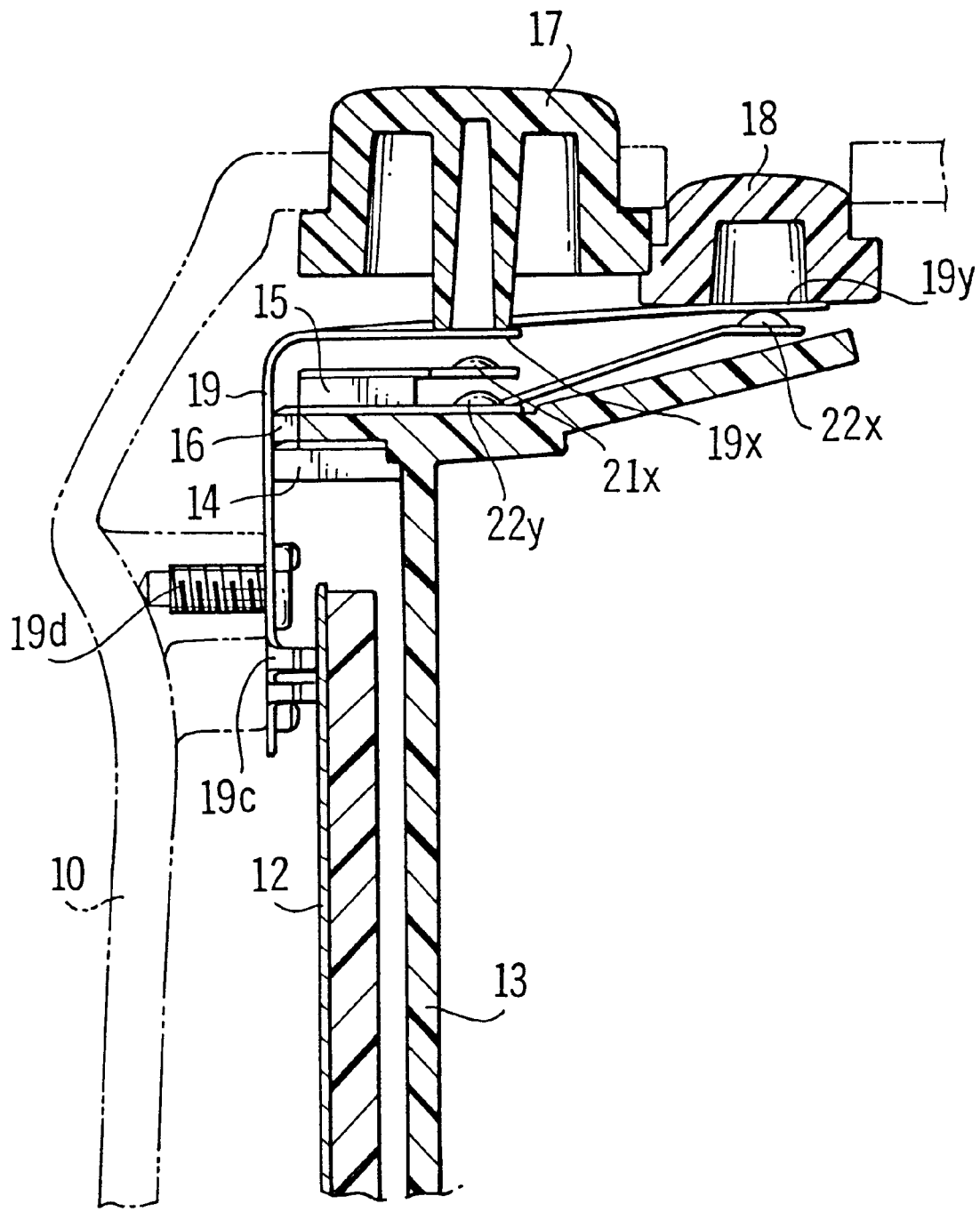
FIG. 6 is a sectioned view along line X—X of FIG. 3, showing a depressed self timer button.

As shown in FIGS. 2 through 6, a shutter release button 17 and a self-timer button 18 are depressably supported on a front decorative plate 10 (shown by a phantom line in FIGS. 5A, 5B, and 6). A common switch plate 19 constructed from electrically conductive plate spring material is fixed to the front decorative plate 10 near the shutter release button 17 and self-timer button 18. Specifically, the common switch plate 19 is fixed to the front decorative plate 10 by means of pins 19d passing through a plurality of mounting holes 19a formed on the common switch plate 19 (as shown in FIGS. 4 through 6). The front decorative plate 10 is fixed in turn to the plastic camera body 13. A resilient shutter release contact arm 19x and a resilient self-timer contact arm 19y fork from the (plate spring) common switch plate 19 toward the lower portion of the shutter release button 17 and the self-timer button 18, respectively. The resilient contact arms 19x and 19y are upwardly biased to contact the buttons 17 and 18, respectively, so that the shutter release button 17 and the self-timer button 18 are held at their undepressed positions. The common switch plate 19 is further provided with a brush 19c to contact a common conductive plate 12.

Since the photometric switch plate 22 is mounted in the camera body 13 as shown in FIG. 2, when the front decorative plate 10 is assembled to the camera body 13 to place the common switch plate in the position shown in FIG. 3, the upper contact 21x opposes the shutter release contact arm 19x of the common switch plate 19. Furthermore, since the release switch plate 22 is mounted in the camera body 3 as shown in FIG. 2, the first contact 22x on the long arm 22L opposes the self-timer contact 19y of the common switch plate 19, and the second contact 22y on the short arm 22S opposes the bottom of the upper contact 21x of the photometric switch plate 21. Thus, when the plates 19, 21, and 22 are mounted in the camera body 13 as shown in FIGS. 3 and 4, the second contact 22y, together with the shutter release contact 19x, acts as the release switch $RLS_{SW}$, and the upper contact 21x of the photometric switch plate 21 is positioned between these two contact terminals.

A common conductive plate 12 having a first DX contact 12b is fixed on the camera body 13, and a separate second DX contact 12a is fixed to the camera body 13 near the first DX contact 12b. As shown in FIGS. 2 and 3, a film cartridge 11, to be placed in a cartridge chamber of the camera body 13, is provided with a DX code conductive pattern 11d on the outer surface thereof.

DX code conductive patterns used on film cartridges have standardized binary code patterns of conductive portions and non-conductive portions, each distinctive DX code pattern representing a certain film speed. Within the many standard DX code patterns, some patterns are alike in one or more of the conductive or non-conductive portions of the pattern. More specifically, in some cases, similar film speeds are alike in at least some portions of the identifying DX code pattern. For example, a specific portion of the various DX code conductive patterns is non-conductive for all standard film speeds under ISO 400, and conductive for all speeds including ISO 400 and above. In the context of this specification, a DX code pattern portion in a predetermied position that defines an exclusive set of film speeds, is defined as a "shared DX code portion". The film cartridge 11 shown in FIGS. 1 through 3 is shown with a shared DX code portion 11e.

Figure 7:
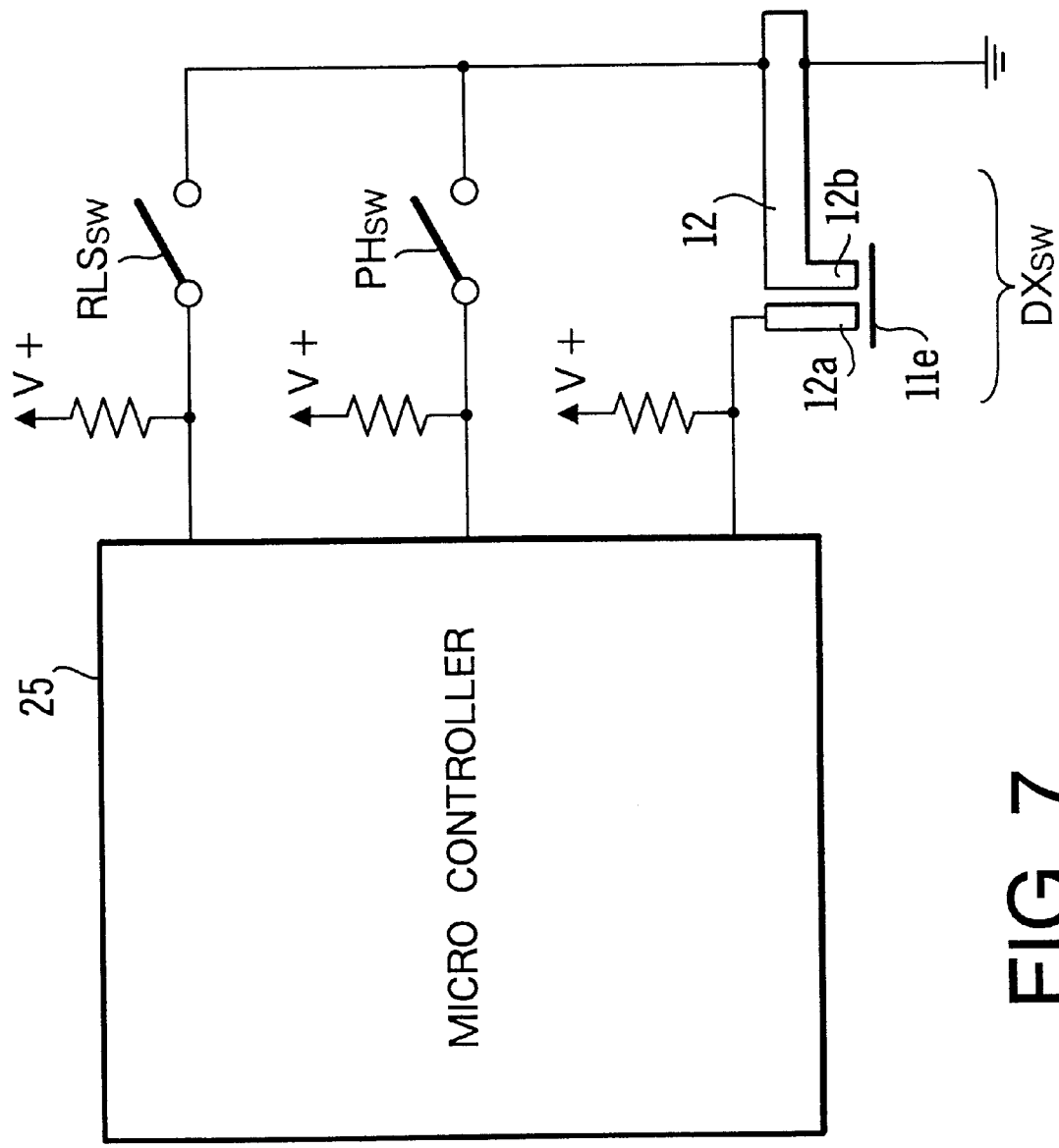
FIG. 7 is a block diagram schematic of the embodiment of a switching device.

FIG. 7 shows a schematic including a controller 25, release switch $RLS_{SW}$, photometric switch $PH_{SW}$, the common conductive plate 12, the first and second DX contacts 12b and 12a, and a shared DX code portion 11e. As shown in FIG. 7, inputs of the controller 25, connected to the release switch $RLS_{SW}$ and the photometric switch $PH_{SW}$, are tied high. Furthermore, the DX contacts 12a, 12b, combined with the shared DX code portion 11e, act as a shared portion detection switch $DX_{SW}$. An input of the controller 25, connected to the shared portion detection switch $DX_{SW}$, is tied high. As shown in FIGS. 1 through 4, a connection to ground is provided for each of the switches $RL_{SW}$, $PH_{SW}$, and $DX_{SW}$ by the common conductive plate 12. A portion (DX contact 12b) of the shared portion detection switch $DX_{SW}$ is unitarily formed with the common conductive plate 12. The self-timer contact arm 19y of the release switch $RLS_{SW}$, and the shutter release contact arm 19x of the photometric switch $PH_{SW}$ are connected to the common conductive plate 12 (as ground) by the brush 19c. The controller 25 controls a metering sensor (not shown) and self-timer circuit (not shown) when one of the shown switches is turned ON or OFF.

As shown in FIGS. 1 through 3, when a film cartridge 11 is inserted in the camera body 13, the DX contacts 12a and 12b contact the shared DX code portion 11e of the DX code conductive pattern 11d of the film cartridge 11. Thus, using the shared portion detection switch $DX_{SW}$, the controller 25 detects which group of two exclusive film speed groups (for example, one of "below ISO 400" or "ISO 400 and above") to which a film inserted in the cartridge chamber belongs, according to the DX code shared portion 11e. If no film is inserted, the controller 25 defaults to one of the exclusive groups.

Figure 8:
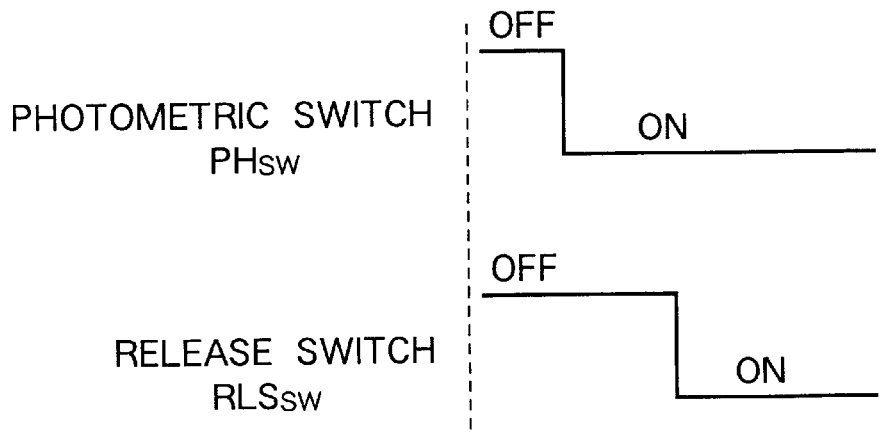
FIG. 8 is a timing chart explaining the operation of a normal shutter release operation when the shutter release button is depressed.

As shown in FIGS. 5A and 8, during a normal shutter release operation, when the shutter release button 17 is half depressed, the shutter release contact arm 19x of the common switch plate 19 moves down to electrically contact the upper contact 21x of the photometric switch plate 21. As shown in FIG. 8, the controller 25 detects the closing of the photometric switch $PH_{SW}$ (that is, a portion of the common switch plate 19 contacts the photometric switch,plate 21), and a photometric measurement is taken in response. Then, when the shutter reease button 17 is further depressed, as shown in FIG. 5B, the shutter release contact arm 19x of the common switch plate 19, the upper contact 21x of the photometric switch plate 21, and the second contact 22y of the release switch plate 22 all contact. As shown in FIG. 8, the controller 25 detects the closing of both the photometric switch $PH_{SW}$ and the release switch $RLS_{SW}$ (that is, portions of the common switch plate 19 contact both of the photometric switch plate 21 and release switch 22), and the exposure operation is carried out in response.

Figure 9:
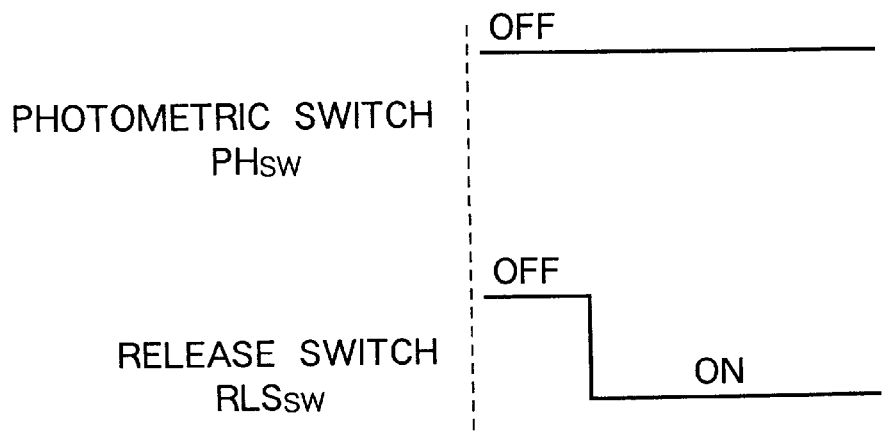
FIG. 9 is a timing chart explaining the operation of self-timer operation when the self-timer button is depressed.

As shown in FIGS. 6 and 9, when the self-timer button 18 is depressed, the self-timer contact arm 19y of the common switch plate 19 moves accordingly down to electrically contact the first contact 22x of the release switch plate 22. Consequently, the controller 25 detects that the release switch $RLS_{SW}$ is closed (that is, that a portion of the common switch plate 19 contacts the shutter release plate 22), but that the photometric switch $PH_{SW}$ is not, and a preset self-timer circuit (not shown) is operated in response. In this case, even though the photometric switch $PH_{SW}$ is not turned ON, the photometric measurement is instructed by the self-timer circuit just prior to the exposure operation.

As described above, a self-timer operation is readily carried out, and the switching device of the camera having a simple structure and improved assembly efficiency is provided.

The present disclosure relates to subject matter contained in Japanese Patent Application No. HEI 06-326323, filed on Dec. 27, 1994, which is expressly incorporated herein by reference in its entirety.

What is claimed is:

1. A switching device for a camera, comprising:

a plurality of switches;

a common switch plate to which each of said plurality of switches is electrically connected;

a conductive plate fixed on a camera body of the camera, said conductive plate having a first DX contact; and a second DX contact fixed to said camera body, which is separated from said first DX contact, said first DX contact and said second DX contact being electrically connected to said common switch plate, wherein said first DX contact and said second DX contact are in contact with a predetermined portion of a DX code conductive pattern of a film cartridge inserted in the camera.

2. The switching device of claim 1, wherein said common switch plate comprises a brush that contacts said conductive plate.

3. The switching device of claim 1, further comprising a controller electrically connected to said plurality of switches and said second DX contact.

4. The switching device of claim 1, wherein said first DX contact and said second DX contact extend into an interior of a film chamber of the camera, contacting said predetermined portion of said DX code conductive pattern.

* * * * *